United States Patent
Jain et al.

(10) Patent No.: US 9,479,849 B2
(45) Date of Patent: Oct. 25, 2016

(54) OTU4 ONE LEVEL DE-MULTIPLEXING SPATIAL FRAMER FOR G.709 OPTICAL TRANSPORT NETWORKS

(71) Applicant: Infinera Corporation, Sunnyvale, CA (US)

(72) Inventors: Ashok Jain, Bangalore (IN); Vishwanathan Paramasivam, Bangalore (IN); Ashok N. Tatineni, Bangalore (IN)

(73) Assignee: Infinera Corporation, Sunnyvale, CA (US)

(*) Notice: Subject to any disclaimer, the term of this patent is extended or adjusted under 35 U.S.C. 154(b) by 74 days.

(21) Appl. No.: 14/617,205

(22) Filed: Feb. 9, 2015

(65) Prior Publication Data

US 2016/0234573 A1   Aug. 11, 2016

(51) Int. Cl.
| | |
|---|---|
| H04B 10/61 | (2013.01) |
| H04Q 11/00 | (2006.01) |
| H04J 3/16 | (2006.01) |
| H04J 3/06 | (2006.01) |
| H04J 14/08 | (2006.01) |

(52) U.S. Cl.
CPC ........ *H04Q 11/0003* (2013.01); *H04B 10/616* (2013.01); *H04J 3/06* (2013.01); *H04J 3/1652* (2013.01); *H04J 14/08* (2013.01); *H04Q 11/0066* (2013.01); *H04J 2203/0091* (2013.01); *H04Q 2011/0083* (2013.01)

(58) Field of Classification Search
CPC ........ H04B 10/616; H04J 14/08; H04J 3/06; H04J 2203/0091
USPC ...... 398/58–79, 98–102, 154, 155, 202, 203
See application file for complete search history.

(56) References Cited

U.S. PATENT DOCUMENTS

| | | | | |
|---|---|---|---|---|
| 5,974,055 | A * | 10/1999 | Imanishi | H04J 3/0605 341/100 |
| 8,989,222 | B1 * | 3/2015 | Mok | H04J 14/0201 370/474 |
| 2009/0148170 | A1 * | 6/2009 | Perkins | H04B 10/5053 398/152 |
| 2010/0215060 | A1 * | 8/2010 | Haas | H04J 3/0632 370/509 |
| 2010/0322630 | A1 * | 12/2010 | Takeuchi | H04J 3/1652 398/65 |
| 2012/0219282 | A1 * | 8/2012 | Koganei | H04L 25/14 398/1 |
| 2012/0263475 | A1 * | 10/2012 | Su | H04J 3/1652 398/100 |
| 2013/0064555 | A1 * | 3/2013 | Kitajima | H04J 3/0608 398/154 |
| 2013/0315592 | A1 * | 11/2013 | Sharma | H04B 10/27 398/58 |

OTHER PUBLICATIONS

Wikipedia, "Frame synchronization," http://en.wikipedia.org/wiki/Frame_synchronization, Dec. 10, 2014, 3 pages.

* cited by examiner

*Primary Examiner* — Li Liu
(74) *Attorney, Agent, or Firm* — Harrity & Harrity LLP; David L. Soltz

(57) ABSTRACT

A method may include generating, by a device, a set of bit masks associated with locating frame alignment signal (FAS) data. The set of bit masks may be utilized by multiple framer circuits associated with identifying a start of one more frames of multiple lower order Optical channel Data Unit (ODU) flows multiplexed in a higher order ODU flow. The method may include detecting, by the device, the FAS data at a particular byte location in a particular lower order ODU flow, of the multiple lower order ODU flows, based on the set of bit masks. The method may include identifying, by the device, the start of one or more frames of the particular lower order ODU flow based on detecting the FAS data. The one or more frames may be associated with an ITU-T G.709 Optical Transport Network frame based signal.

20 Claims, 11 Drawing Sheets

OTU4 ONE LEVEL DE-MULTIPLEXING SPATIAL FRAMER FOR G.709 OPTICAL TRANSPORT NETWORKS

BACKGROUND

An Optical Transport Network (OTN) is defined by ITU-T as a set of optical elements that are connected by optical links and that are capable of providing transporting, multiplexing, switching, management, and supervision functionality, and survivability of optical channels carrying client signals.

An OTN uses digital wrapper technology that provides a method for encapsulating data in an optical data unit. Generally, digital wrapping involves grouping a number of existing optical data units together into one entity that can be more efficiently managed with a small allocation of overhead and forward error correction (FEC) bytes. There are multiple levels of hierarchy for encapsulation, including an Optical channel Payload Unit (OPU) for encapsulation of client data, an Optical channel Data Unit (ODU) for encapsulating the OPU data, an Optical channel Transport Unit (OTU) for encapsulating the ODU data.

A higher order (HO) ODU flow may hierarchically be comprised of one or more lower order (LO) ODU flows multiplexed into the HO ODU flow. For example, an ODU4 flow, a particular HO ODU, may include a combination of LO ODU flows (e.g., ODU0, ODU1, ODU2, ODU2e, ODU3, ODU3e, ODU3e2, ODUflex, etc.) occupying a set of byte slots associated with the ODU4 flow. Frames of an ODU flow may be identified by frame alignment signal (FAS) data. Consequently, an optical receiver may include a framer circuit to detect FAS data for each LO ODU flow in order to read information from the LO ODU flows.

SUMMARY

According to some possible implementations, a method may include generating, by a device, a set of bit masks associated with locating frame alignment signal (FAS) data. The set of bit masks may be utilized by multiple framer circuits associated with identifying a start of one more frames of multiple lower order Optical channel Data Unit (ODU) flows multiplexed in a higher order ODU flow. The method may include detecting, by the device, the FAS data at a particular byte location in a particular lower order ODU flow, of the multiple lower order ODU flows, based on the set of bit masks. The method may include identifying, by the device, the start of one or more frames of the particular lower order ODU flow based on detecting the FAS data. The one or more frames may be associated with an ITU-T G.709 Optical Transport Network frame based signal.

According to some possible implementations, an optical receiver may include a digital signal processor (DSP). The DSP may receive an Optical channel Transport Unit (OTU) frame that includes a higher order Optical channel Data Unit (HO ODU) flow. The HO ODU flow may include one or more lower order Optical channel Data Unit (LO ODU) flows. The HO ODU flow may be a higher order relative to the one or more lower order ODU flows. The DSP may generate a set of bit masks for a particular LO ODU flow of the one or more LO ODU flows. The DSP may provide the set of bit masks to a plurality of framer circuits. The DSP may detect, by one of the plurality of framer circuits, frame alignment signal (FAS) data, being transmitted via the particular LO ODU flow, for a frame of the LO ODU flow based on the set of bit masks. The DSP may calculate an offset value for the FAS data. The offset value may represent a shift in a byte position of the FAS data in a subsequent frame of the particular LO ODU flow. The DSP may predict one or more FAS data occurrences, as one or more predicted FAS data occurrences, for one or more subsequent frames of the particular LO ODU flow based on the offset value. The DSP may selectively read information from the particular LO ODU flow based on the one or more predicted FAS data occurrences.

According to some possible implementations, an apparatus may include one or more comparator circuits and a plurality of framer circuits. A comparator circuit, of the one or more comparator circuits, may receive a set of bytes of a higher order Optical channel Data Unit (ODU). The comparator circuit may generate a bit mask associated with identifying a byte location of a particular byte within the set of bytes. The particular byte may correspond to a frame alignment signal (FAS). The comparator circuit may provide the bit mask to a set of framer circuits, of the plurality of framer circuits. The set of framer circuits may correspond to a set of lower order ODUs included in the set of bytes of the higher order ODU. A particular framer, of the plurality of framer circuits, may receive the set of bytes of the higher order ODU and the bit mask. The set of bytes may include a particular set of bytes associated with a particular lower order ODU of the set of lower order ODUs. The particular framer may determine a location for FAS data for a frame of the particular lower order ODU using the bit mask. The particular framer may predict a subsequent location for subsequent FAS data associated with a subsequent frame of the particular lower order ODU based on the location for the FAS data.

DETAILED DESCRIPTION

The following detailed description of example implementations refers to the accompanying drawings. The same reference numbers in different drawings may identify the same or similar elements.

ITU-T Recommendation G.709 "Interfaces for Optical Transport Network (OTN)" standardizes frame formats for carrying client data signals. Lower order frame structures (e.g., lower order ODUs) may be aggregated to form a higher order ODU. For example, a set of ODU1s may be aggregated to form an ODU4. Similarly, one or more other lower order ODUs may be aggregated to form a higher order ODU, such as one or more ODU0s, one or more ODU1s, one or more ODU2s, one or more ODU2es, one or more ODU3s, one or more ODU3e2s, and/or one or more ODUflexes (e.g., ODU flex constant bit rate, ODU flex generic framing procedure, etc.) being aggregated to form an ODU4. Multiple lower order ODUs may be interleaved together within slots of a higher order ODU. For example, a higher order ODU4 may include a first ODUflex and a second ODUflex each occupying a set of non-contiguous slots.

A receiver associated with a particular node of a network may demultiplex a higher order ODU to reveal information associated with the lower order frame structures, such as operations, administration, and management (OAM) information regarding the lower order ODUs, OAM information regarding the higher order ODU, or the like. The OAM information may be utilized to control a transmission. Moreover, detecting faults in a network, alarm insertion signaling, and protection switching may utilize information associated with the lower order ODUs. However, reading information associated with the lower order ODUs may require significant processing resources to identify frames of lower order ODUs that include bytes which are interleaved together and spread across multiple clock cycles. Implementations, described herein, may facilitate one level ODU4 demultiplexing and reading information from lower order ODUs using a shared comparator bit mask and a set of spatial-domain framers. In this way, a spatial-domain framer may be implemented via an application-specific integrated circuit (ASIC), a field-programmable gate array (FPGA), or the like, and latency and gate count may be reduced as compared with a time-domain framer.

Figure 1:
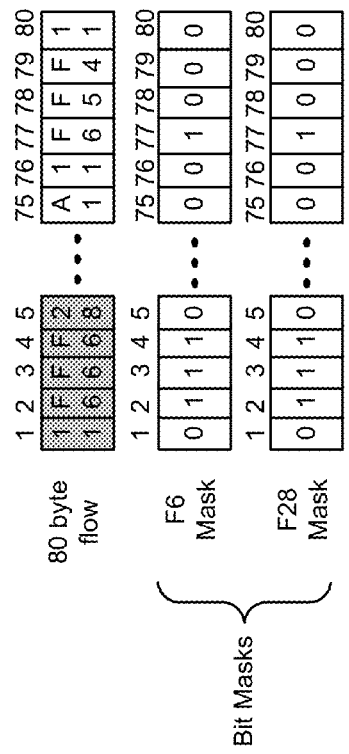
FIG. 1 is a diagram of an overview of an example implementation described herein.
Figure 1:
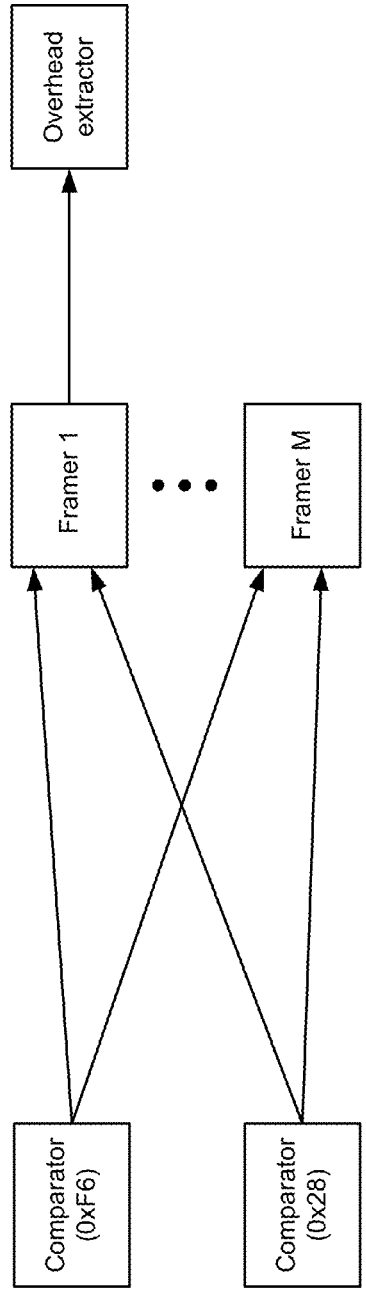

FIG. 1 is a diagram of an overview of an example implementation 100 described herein. With regard to FIG. 1A, assume that an optical receiver device (e.g., that may include a set of comparators, a set of framers, and an overhead extractor) has identified frames of an incoming OTU signal (e.g., an OTU4 signal). The optical receiver may extract, from the frames of the OTU signal, OTU payload information that includes a higher order ODU flow (e.g., an ODU4 flow). The payload information may be processed in multiple 80 byte sets. The optical receiver may streamline interleaved bytes, corresponding to one or more lower order ODU flows included in the higher order ODU flow, and may generate a bit mask identifying locations of bytes associated with frame alignment signal (FAS) data. For example, the set of comparators of the optical receiver may generate a set of bit masks, such as a first bit mask identifying byte locations, within an 80 byte set, of a 0xF6 hexadecimal byte and a second bit mask identifying byte locations of a 0x28 hexadecimal byte. The set of comparators may provide the set of bit masks to each framer of the optical receiver that is assigned to detect FAS data for a lower order ODU.

A particular framer may utilize the bit mask to analyze a set of bytes, of the 80 byte set, associated with the lower order ODU to locate the FAS data. In some implementations, the particular framer may search for the FAS data across multiple 80 byte sets corresponding to multiple clock cycles. The particular framer may, after determining FAS data location associated with the FAS data, calculate an offset value for the FAS data location. The offset value may refer to a quantity associated with a shift associated with the FAS data location over multiple frames. Based on the offset value, the particular framer may predict one or more future FAS occurrences at one or more locations in the OTU4 frame. If the one or more future FAS occurrences are predicted accurately within a threshold level, the receiver device may frame onto the lower order ODU to extract information (e.g., overhead information, OAM information, etc.) associated with the lower order ODU.

In this way, a spatial-domain framing circuit of an optical receiver may facilitate demultiplexing a lower order ODU out of a higher order ODU to determine information such as OAM information, using a reduced gate count and reduced latency compared with a time-domain framing circuit.

Figure 2:
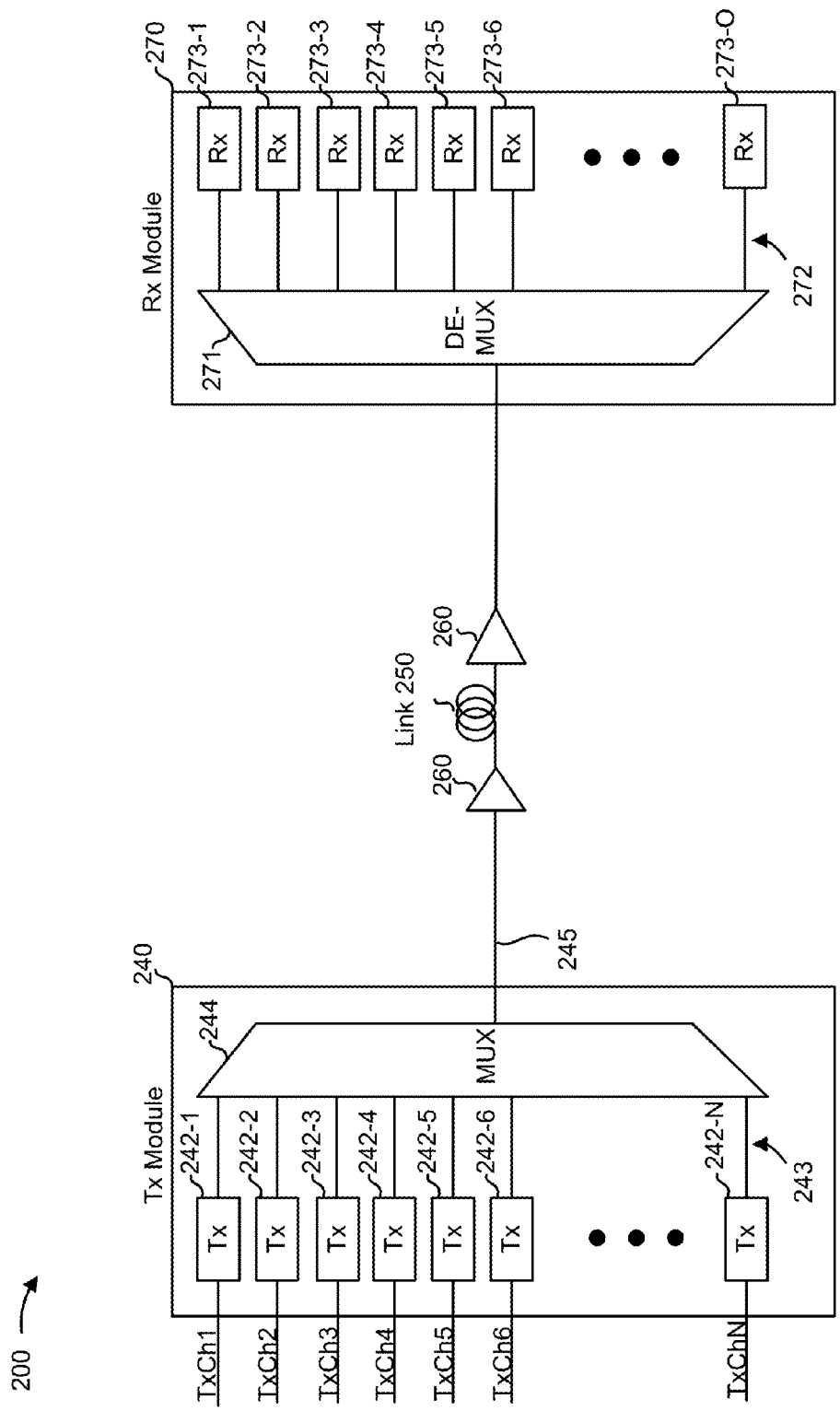
FIG. 2 is a diagram of an example network in which systems and/or methods, described herein, may be implemented.

FIG. 2 is a diagram of an example devices of an optical network 200 that may be designed, monitored, and/or configured according to implementations described herein. One or more devices of FIG. 2 may operate within optical network 200. As shown in FIG. 2, optical network 200 may include transmitter module 240 (e.g., a Tx PIC) and/or receiver module 270 (e.g., an Rx PIC). In some implementations, transmitter module 240 may be optically connected to receiver module 270 via link 250 and/or optical amplifiers 260. One or more optical amplifiers 260 may amplify an optical signal as the optical signal is transmitted over link 250.

Transmitter module 240 may include a number of optical transmitters 242-1 through 242-N (N≥1), waveguides 243, and/or optical multiplexer 244. Each optical transmitter 242 may receive a data channel (TxCh1 through TxChN), may modulate the data channel with an optical signal, and may transmit the data channel as an optical signal. In some implementations, transmitter module 240 may include 5, 10, 20, 50, 100, or some other number of optical transmitters 242. Each optical transmitter 242 may be tuned to use an optical carrier of a designated wavelength.

Waveguides 243 may include optical links to transmit modulated outputs (referred to as "signal channels") of optical transmitters 242. In some implementations, each optical transmitter 242 may connect to one waveguide 243 or to multiple waveguides 243 to transmit signal channels of optical transmitters 242 to optical multiplexer 244. In some implementations, waveguides 243 may be made from a birefringent material and/or some other material.

Optical multiplexer 244 may include an arrayed waveguide grating (AWG) or some other multiplexing device. In some implementations, optical multiplexer 244 may combine multiple signal channels, associated with optical transmitters 242, into a wave division multiplexed (WDM) signal, such as optical signal 245.

As further shown in FIG. 2, receiver module 270 may include optical demultiplexer 271, waveguides 272, and/or optical receivers 273-1 through 273-O (O≥1). In some implementations, optical demultiplexer 271 may include an AWG or some other demultiplexing device. Optical demultiplexer 271 may supply multiple signal channels based on a received WDM signal (e.g., optical signal 245). As shown in FIG. 2, optical demultiplexer 271 may supply signal channels to optical receivers 273 via waveguides 272.

Waveguides 272 may include optical links to transmit outputs of optical demultiplexer 271 to optical receivers 273. In some implementations, each optical receiver 273 may receive outputs via a single waveguide 272 or via multiple waveguides 272. In some implementations, waveguides 272 may be made from a birefringent material and/or some other kind of material.

Optical receivers 273 may each operate to convert an input optical signal to an electrical signal that represents the transmitted data. In some implementations, optical receivers 273 may each include one or more photodetectors and/or related devices to receive respective input optical signals outputted by optical demultiplexer 271 and a local oscillator, convert the signals to a photocurrent, and provide a voltage output to function as an electrical signal representation of the original input signal.

The number and arrangement of devices and networks shown in FIG. 2 are provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, or alternatively, one or more of the devices of optical network 200 may perform one or more functions described as being performed by another one or more of the devices of optical network 200.

Figure 3:
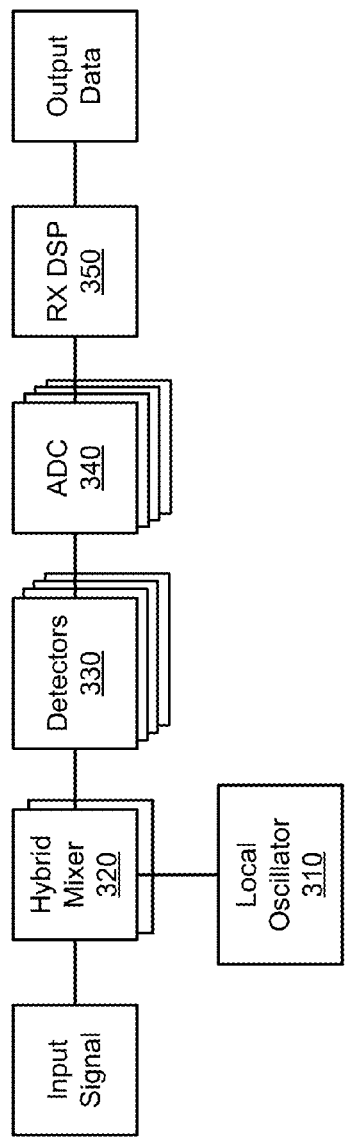
FIG. 3 is a diagram of example components of an optical receiver shown in FIG. 2.

FIG. 3 is a diagram of example components of optical receiver 273 as shown in FIG. 2. As shown in FIG. 3, optical receiver 273 may include a local oscillator 310, one or more hybrid mixers 320, one or more detectors 330, one or more analog-to-digital converters (ADCs) 340, and/or a receiver digital signal processor (Rx DSP) 350. In some implementations, local oscillator 310, hybrid mixer 320, detectors 330, ADCs 340, and/or Rx DSP 350 may be implemented on one or more integrated circuits, such as one or more PICs, one or more ASICs, etc.

Local oscillator 310 may include a laser device. In some implementations, local oscillator 310 may provide a reference signal to hybrid mixer 320. In some implementations, local oscillator 310 may include a single-sided laser to provide an optical signal to hybrid mixer 320. In some other implementations, local oscillator 310 may include a double-sided laser to provide multiple optical signals to multiple hybrid mixers 320. In some implementations, a phase, intensity, and/or amplitude of the reference signal may be compared to a phase, intensity, and/or amplitude of an input signal (e.g., a WDM signal supplied by optical demultiplexer 271 and corresponding to an output signal provided by transmitter module 240) to recover data carried by the input signal.

Hybrid mixer 320 may include one or more optical devices to receive an input signal (e.g., a WDM signal supplied by optical demultiplexer 271 and corresponding to an output signal provided by transmitter module 240). In some implementations, hybrid mixer 320 may receive a reference signal from local oscillator 310. In some implementations, hybrid mixer 320 may supply optical components associated with the input signal and the reference optical signal to detectors 330. For example, hybrid mixer 320 may supply an in-phase x-polarization (e.g., x-pol) component, a quadrature x-pol component, an in-phase y-polarization (e.g., y-pol) component, and a quadrature y-pol component. In some implementations, a first hybrid mixer 320 may provide the in-phase x-pol component and the quadrature x-pol component, and a second hybrid mixer 320 may provide the in-phase y-pol component and the quadrature y-pol component.

Detector 330 may include one or more photodetectors, such as a photodiode, to receive the output optical signal, from hybrid mixer 320, and convert the output optical signal to corresponding voltage signals. In some implementations, optical receiver 273 may include multiple detectors 330 for in-phase x-pol components, quadrature x-pol components, in-phase y-pol components, and quadrature y-pol components. In some implementations, detectors 330 may include one or more balanced pairs of photodetectors. For example, detectors 330 may include a first pair of photodetectors to receive an in-phase x-pol component, and a second pair of photodetectors to receive a quadrature x-pol component. Additionally, detectors 330 may include a third pair of photodetectors to receive an in-phase y-pol component, and a fourth pair of photodetectors to receive a quadrature y-pol component.

ADC 340 may include an analog-to-digital converter that converts the voltage signals from detector 330 to digital signals. ADC 340 may provide the digital signals to Rx DSP 350. In some implementations, optical receiver 273 may include four ADCs 340 or some other number of ADCs 340 (e.g., one ADC 340 for each electrical signal output by detectors 330).

Rx DSP 350 may include a digital signal processing device or a collection of digital signal processing devices. In some implementations, Rx DSP 350 may receive digital signals from ADCs 340 and may process the digital signals to form output data associated with the input signal received by hybrid mixer 320.

While FIG. 3 shows optical receiver 273 as including a particular quantity and arrangement of components, in some implementations, optical receiver 273 may include additional components, fewer components, different components, or differently arranged components.

Figure 4:
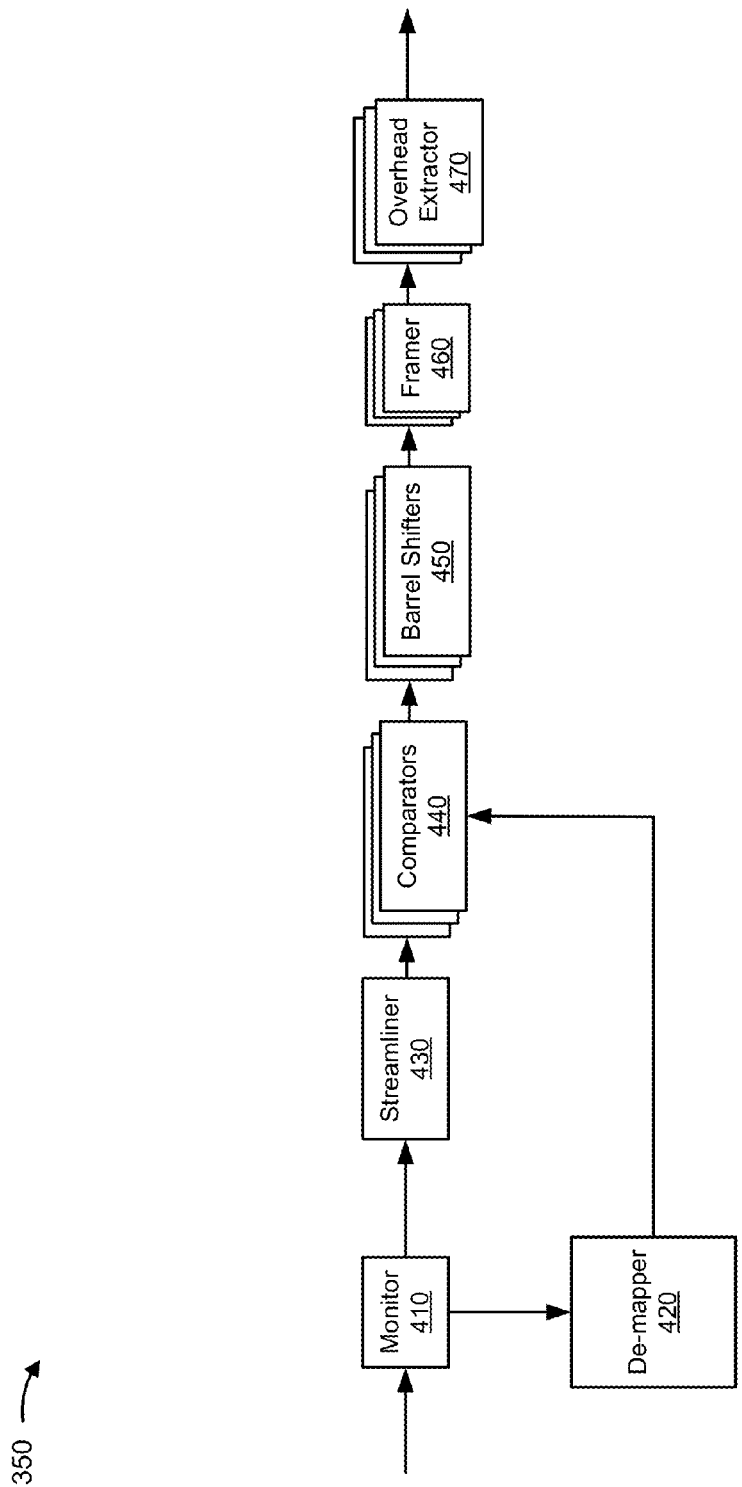
FIG. 4 is a diagram of example components of a digital signal processor shown in FIG. 3.

FIG. 4 is a diagram of example components of Rx DSP 350 as shown in FIG. 3. As shown in FIG. 4, Rx DSP 350 may include a monitor 410, a de-mapper 420, a streamliner 430, one or more comparators 440, one or more barrel shifters 450, one or more framers 460, and one or more overhead extractors 470. In some implementations, monitor 410, de-mapper 420, streamliner 430, comparator 440, barrel shifter 450, framer 460, and/or overhead extractor 470 may be implemented on one or more integrated circuits, such as one or more PICs, one or more ASICs, one or more FPGAs, or the like.

Monitor 410 may include an OTU4 framer and ODU4 overhead monitor that receives an OTU4 signal for demultiplexing into lower order ODUs. Monitor 410 may identify an incoming OTU4 frame and may extract OTU4 payload information from the OTU4 frame. The OTU4 payload information may include an ODU4 flow, which includes multiple lower order ODU flows. Monitor 410 may provide the ODU4 flow to de-mapper 420 and/or streamliner 430 for processing, as discussed in detail with regard to FIG. 6.

De-mapper 420 may include a generic mapping procedure de-mapper that may process timing information (e.g., a Cm value indicating a quantity of data bytes per frame of the ODU4 frame) of a particular set of bytes and determine whether the set of bytes is valid. A valid set of bytes may refer to a set of bytes associated with a lower order ODU flow. In contrast, an invalid set of bytes may refer to information that may be added as a placeholder to fill unused locations in a set of bytes. In general, de-mapper 420 may receive an 80 byte set and may determine that all 80 bytes are valid or invalid, as discussed in detail with regard to FIG. 6.

Streamliner 430 may include a de-interleaver that may de-interleave multiple lower order ODU flows embedded in a higher order ODU flow. For example, streamliner 430 may receive a set of bytes associated with an ODU4 that include non-contiguous bytes of multiple lower order ODUs and may de-interleave the bytes of the multiple lower order ODUs, as discussed in detail with regard to FIG. 5A and FIG. 6.

Comparator 440 may include a logic device that may perform a logical operation on the 80 bytes to generate a bit mask identifying possible locations for FAS data. In some implementations, comparator 440 may be configured to provide the bit mask to multiple framers 450 associated with searching for FAS data to determine a start of a frame for a lower order ODU, as discussed in detail with regard to FIG. 5B and FIG. 6.

Barrel shifter 450 may include a digital circuit that may shift the mask generated by comparator 440 by a particular quantity of bits in a particular time step (e.g., a particular clock cycle). Barrel shifter 450 may utilize a binary look up to shift the mask. A particular barrel shifter 450, of a set of barrel shifters 450, may correspond to a particular framer 460 of a set of framers 460, as discussed in detail with regard to FIG. 6.

Framer 460 may include a spatial framer that includes a digital circuit to locate FAS data in a set of bytes and frame onto a lower order ODU flow based on locating the FAS data. In some implementations, framer 460 may locate the FAS data in a single clock cycle. In some implementations, framer 460 may locate the FAS data in multiple clock cycles. A particular framer 460 may locate FAS data for a particular lower order ODU. For example, a first framer 460 may locate first FAS data to determine a start of a frame for a first lower order ODU and a second framer 460 may locate second FAS data to determine a start of a frame for a second lower order ODU, as discussed in detail with regard to FIGS. 5C-5F and FIG. 6. Additionally, or alternatively, framer 460 may be associated with a particular circuit complexity as discussed in detail with regards to FIG. 6.

Figure 6:
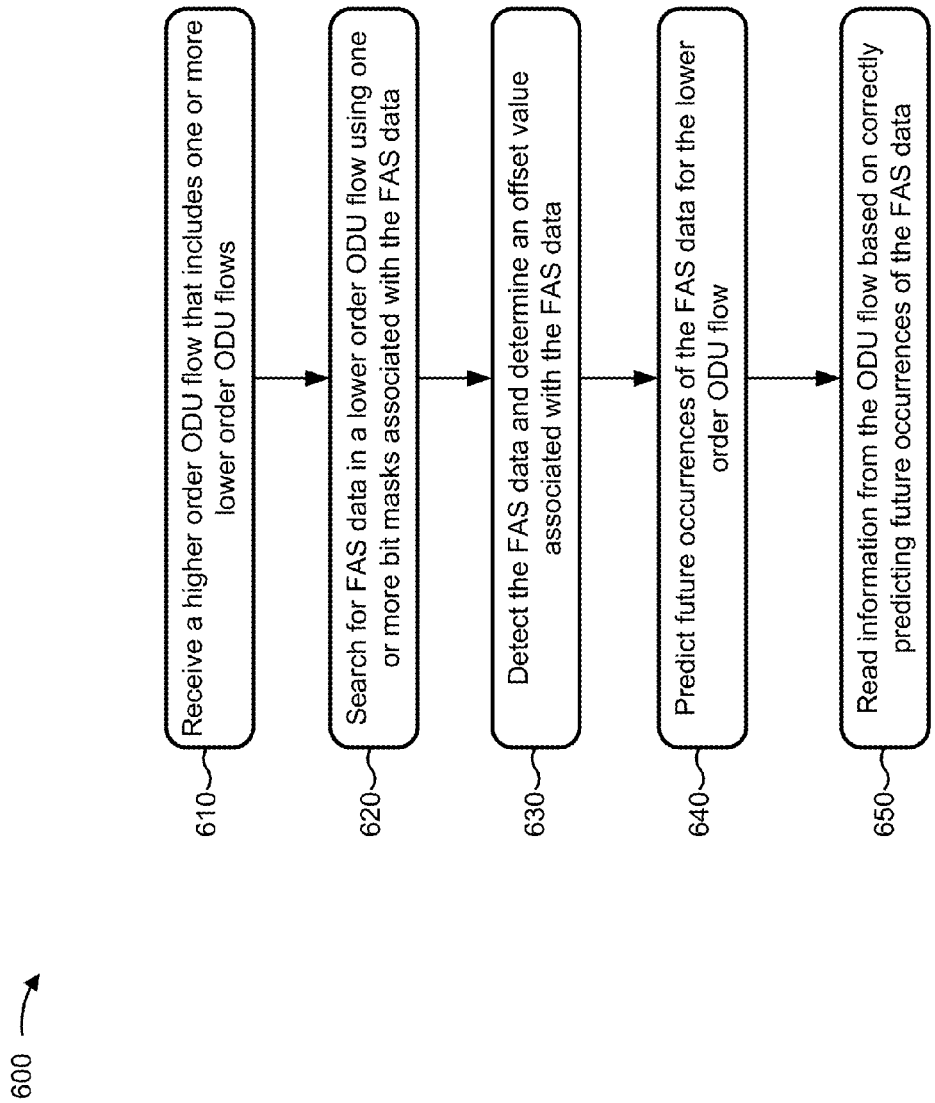
FIG. 6 is a flow chart of an example process for identifying a start of a frame of a lower order ODU flow and reading information from the lower order ODU flow.

Overhead extractor 470 may include a digital circuit that may extract overhead information from a lower order ODU flow for which a start of a frame of the lower order ODU has been determined based on framer 460 determining offset information, as discussed in detail with regard to FIG. 6. In some implementations, overhead extractor 470 may determine a bit interleaved parity (BIP) value based on the overhead information associated with the lower order ODU flow.

While FIG. 4 shows Rx DSP 350 as including a particular quantity and arrangement of components, in some implementations, Rx DSP 350 may include additional components, fewer components, different components, or differently arranged components. Additionally, or alternatively, components described herein as being components of Rx DSP 350 may be implemented as components of another network device 230 and/or component thereof.

FIGS. 5A-5F are diagrams of an example implementation 500 of identifying a start of a frame of a lower order ODU flow and reading information from the lower order ODU flow.

Figure 5A:
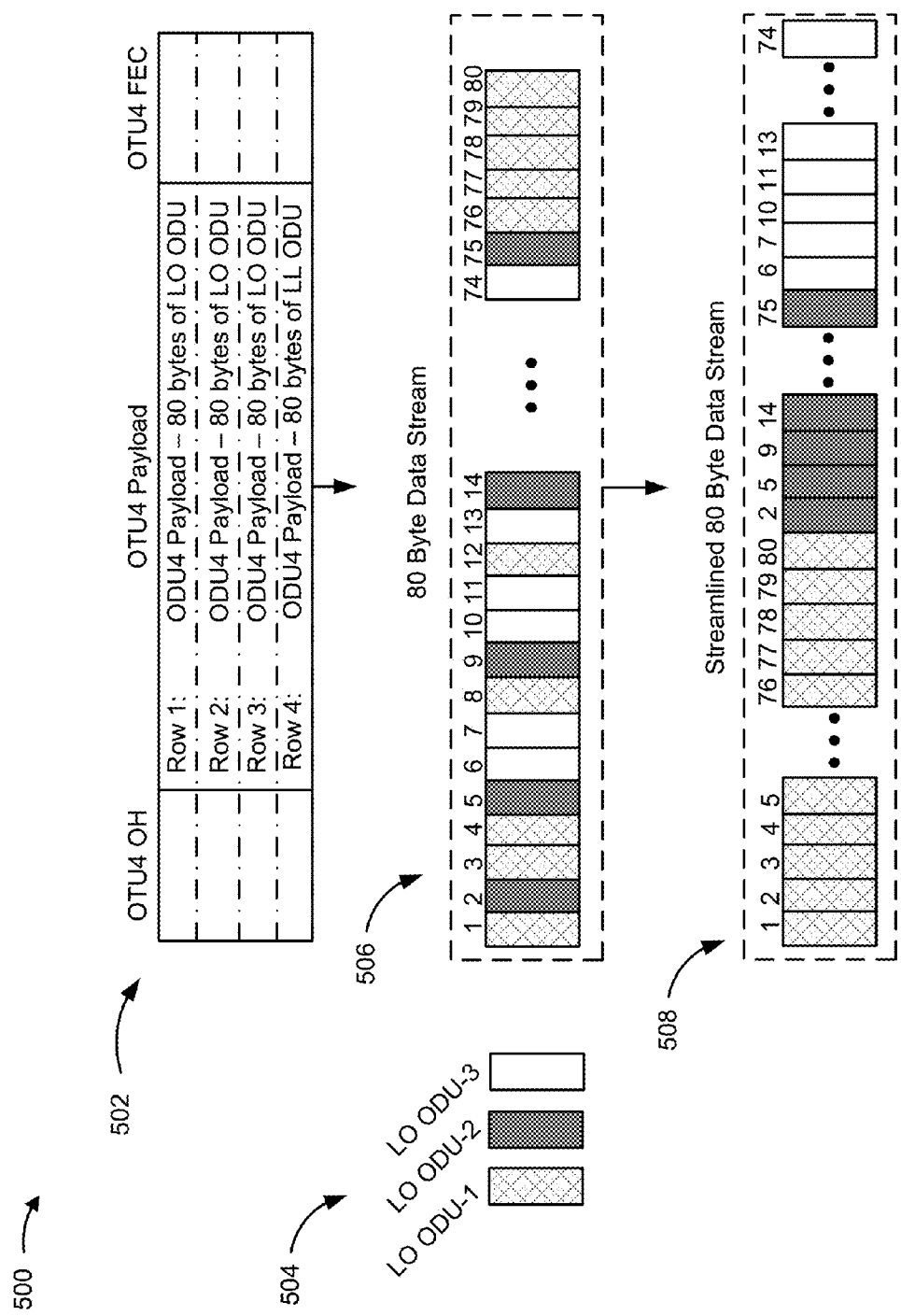
FIGS. 5A-5F are diagrams of an example implementation of identifying a start of a frame of a lower order ODU flow and reading information from the lower order ODU flow.

As shown by FIG. 5A, and by reference number 502, a particular OTU4 frame may include OTU4 overhead (OH) information, OTU4 payload information, and OTU4 forward error correction (FEC) information. The OTU4 payload information may include multiple rows of ODU4 payload information. A particular row of ODU4 payload may include 80 bytes associated with multiple lower order ODUs (LO ODU). As shown by reference number 504, the multiple lower order ODUs may include a first lower order ODU (LO ODU-1), a second lower order ODU (LO ODU-2), and a third lower order ODU (LO ODU-3). As shown by reference number 506, a particular set of 80 bytes (e.g., an 80 byte data stream corresponding to a single row of ODU4 payload) may include multiplexed bytes of the multiple lower order ODUs. For example, at byte location 1 and byte location 3, the set of 80 bytes includes a byte associated with LO ODU-1, at byte location 2 the set of 80 bytes includes a byte associated with LO ODU-2, and at byte location 6 the set of 80 bytes includes a byte associated with LO ODU-3.

Assume that streamliner 430 processes the set of 80 bytes to demultiplex the set of 80 bytes. As shown by reference number 508, streamliner 430 outputs the set of 80 bytes after demultiplexing. For example, a set of bytes of LO ODU-1 are followed sequentially by a set of bytes of LO ODU-2 and a set of bytes of LO ODU-3.

Figure 5B:
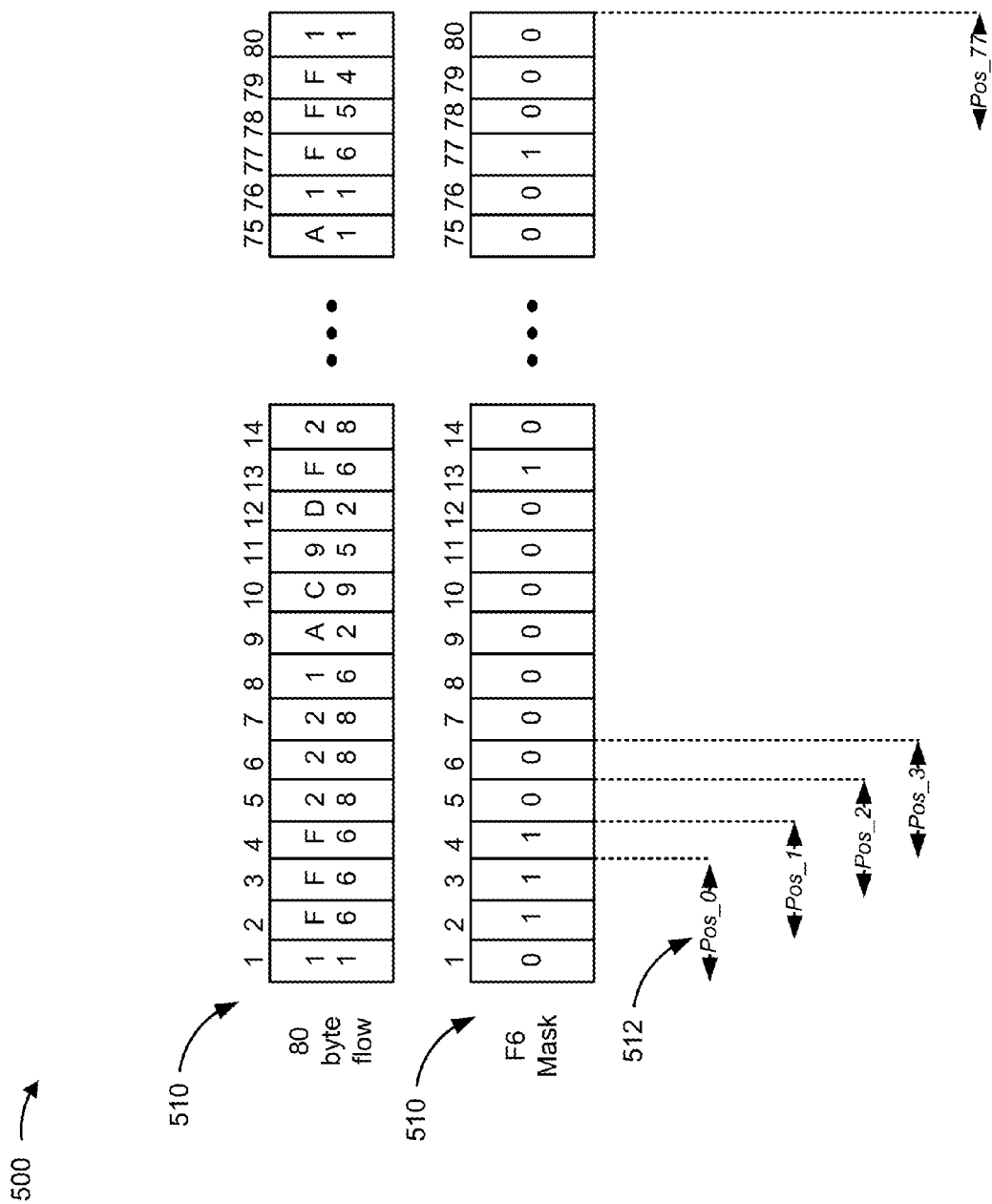

As shown by FIG. 5B, and by reference number 510, the set of 80 bytes includes particular hexadecimal values for each byte. For example, byte location 1 includes a "0x11" byte, byte location 2 includes a "0xF6" byte, and byte location 3 includes another "0xF6" byte. Assume that the particular FAS data that framer 460 is to locate is a 6 byte sequence "0xF6, 0xF6, 0xF6, 0x28, 0x28, 0x28" (that may be indicated by a "F6" or a "28"). As shown by reference number 510, comparator 440 generates a bit mask for the 0xF6 byte that identifies byte locations with a 0xF6 byte (e.g., that are indicated by a 1) and byte locations without a 0xF6 byte (e.g., that are indicated by a 0). For example, byte locations 2, 3, 4, 13, and 77 include a 0xF6 byte. As shown by reference number 512, for the particular FAS data (e.g., that includes a group of 3 sequential 0xF6 bytes), each group of 3 byte locations may be described by an index value. For example, byte locations 1 through 3 are labeled with index value 0 (e.g., "Pos_0") and byte locations 2 through 4 are labeled with index value 1 (e.g., "Pos_1"). This may be utilized when determining the offset value.

Figure 5C:
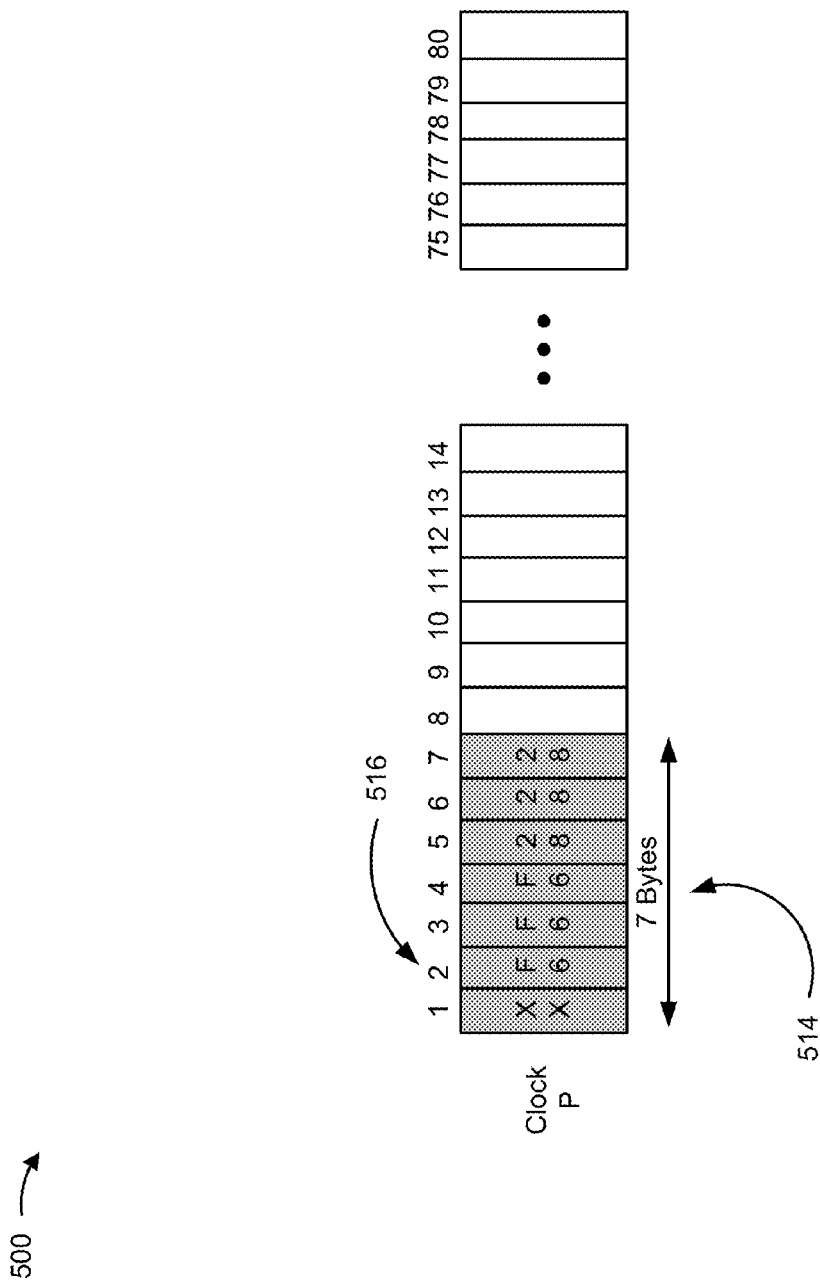

In one example, as shown by FIG. 5C, and by reference number 514, a particular lower order ODU flow included in the set of 80 bytes may occupy 7 bytes. In each clock cycle, framer 460 may utilize the set of bit masks to search for the FAS data. As shown by reference number 516, framer 460 may determine that the FAS data is located within a single clock cycle N, occupying byte locations 2, 3, 4, 5, 6, and 7. Based on the FAS data being located within a single clock cycle, the flow size (e.g., that the lower order ODU flow occupies 7 bytes), the FAS data size (e.g., that the FAS data includes 6 bytes), and the index value of the 0xF6 bytes of the FAS data (e.g., Pos_1=1), framer 460 may determine an offset value of 0.

Figure 5D:
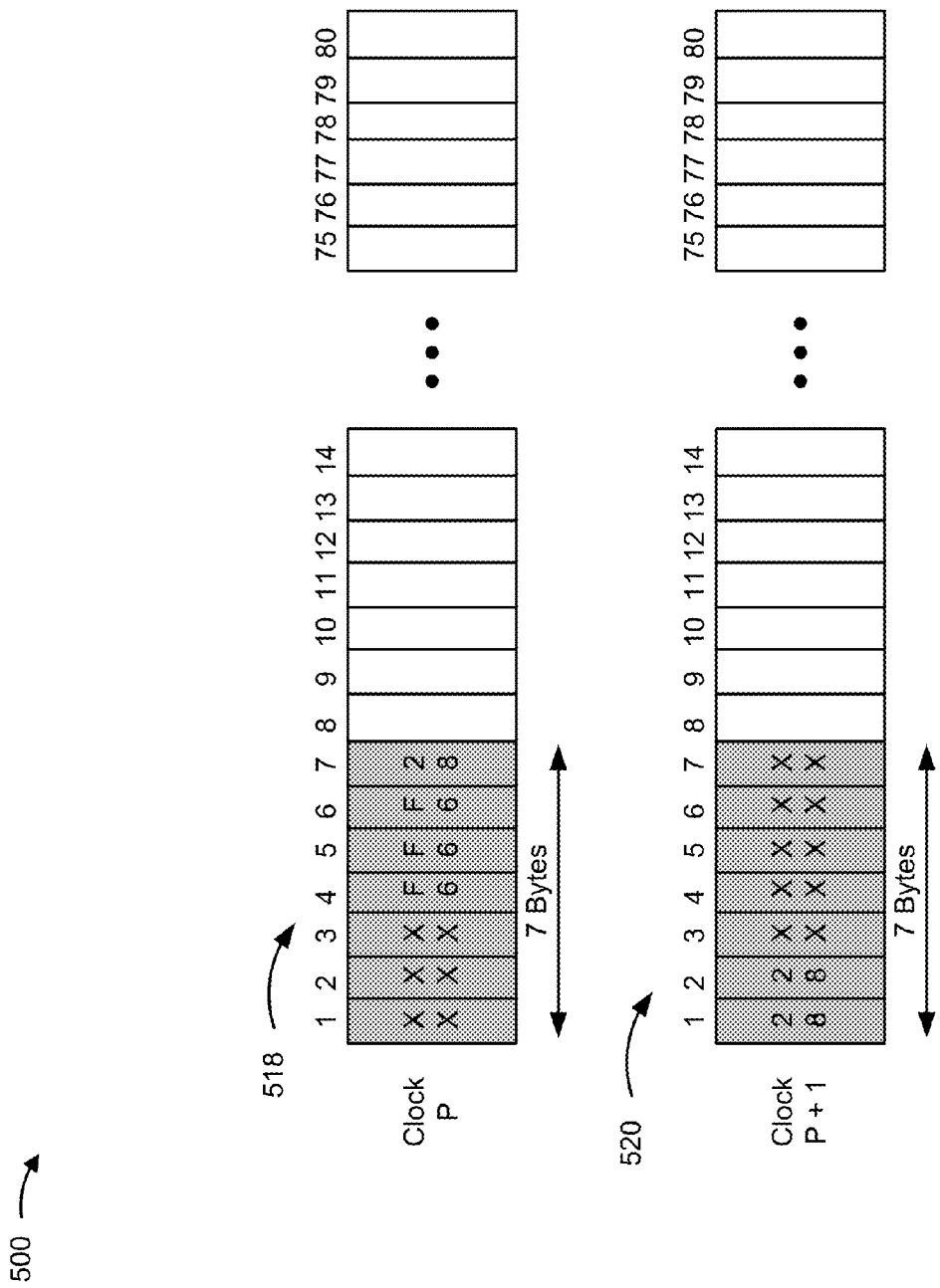

In another example, as shown in FIG. 5D, and by reference number 518, framer 460 may detect some bytes (e.g., "F6, F6, F6, 28") of the FAS data in a first set of 80 bytes during a first clock cycle P. As shown by reference number 520, when a second set of 80 bytes arrives during a second clock cycle P+1, framer 460 may detect the remaining bytes (e.g., "28, 28") of the FAS data. Based on the FAS data being located within 2 clock cycles, the flow size, and the tail position of the FAS data (e.g., the final 0x28 byte is located at byte location 2), framer 460 may determine an offset value of 5.

Figure 5E:
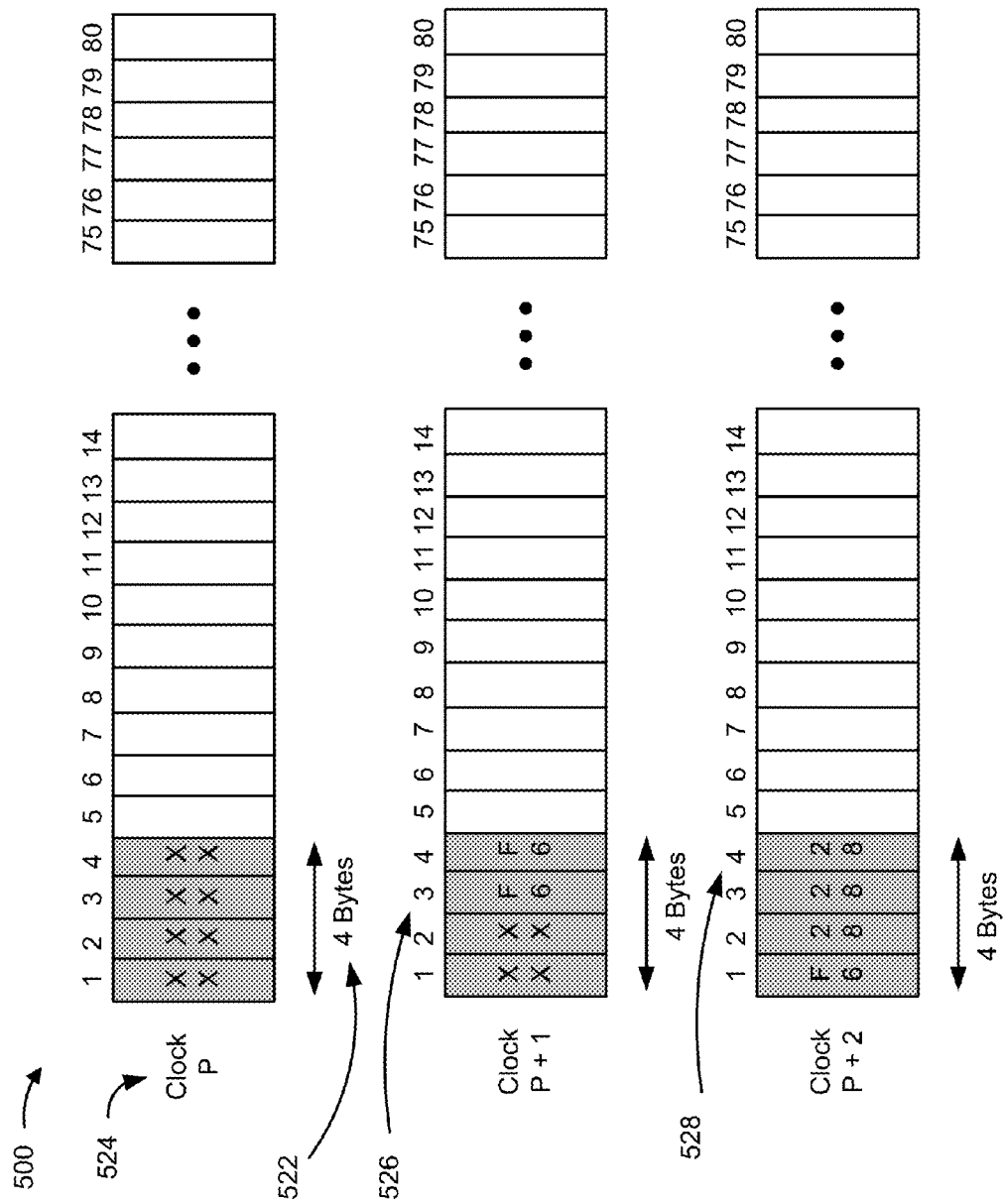

In another example, as shown in FIG. 5E, and by reference number 522, a lower order ODU flow in the set of 80 bytes may occupy 4 bytes. As shown by reference number 524, framer 460 may determine that no bytes of the FAS data are located in a first set of 80 bytes during a first clock cycle P. As shown by reference number 526, framer 460 may detect some bytes (e.g., "F6, F6") of the FAS data in a second set of 80 bytes during a second clock cycle P+1. As shown by reference number 528, framer 460 may detect the remaining bytes (e.g., "F6, 28, 28, 28") in a third set of 80 byes during a third clock cycle P+2. Based on the FAS data being located in 2 clock cycles, the flow size (e.g., 4), and the tail position of the FAS data (e.g., byte location 4), framer 460 may determine an offset value of 0.

Figure 5F:
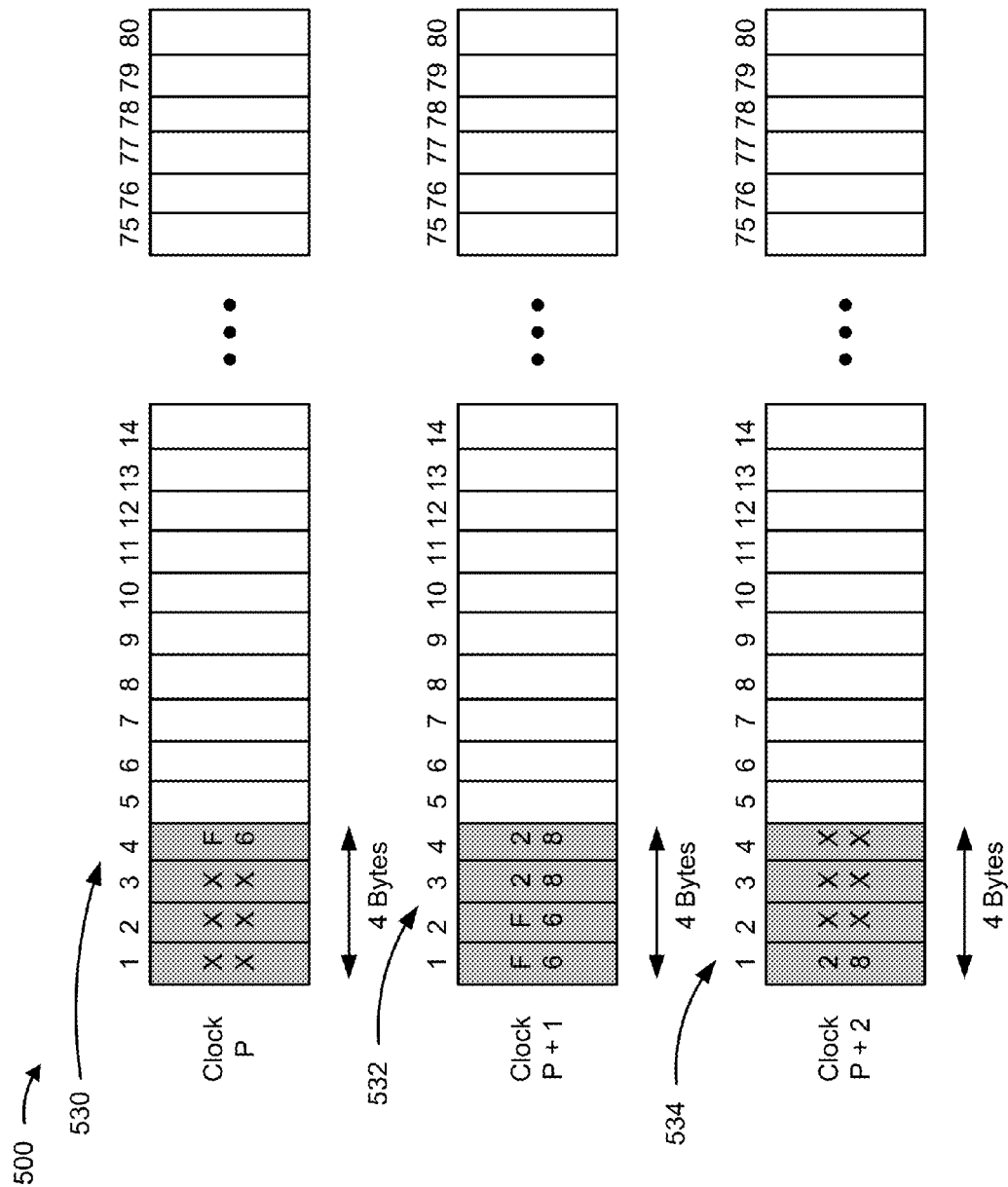

In another example, as shown in FIG. 5F, and by reference number 530, framer 460 may determine that a byte (e.g., "F6") of the FAS data is located in a first set of 80 bytes during a first clock cycle P. As shown by reference number 532, framer 460 may determine that some bytes (e.g., "F6, F6, 28, 28") of the FAS data are located in a second set of 80 bytes during a second clock cycle P+1. As shown by reference number 534, framer 460 may determine that a final byte (e.g., "28") of the FAS data is located in a third set of 80 bytes during a third clock cycle P+2. Based on the FAS data being located in 3 clock cycles, the flow size, and the tail position of the FAS data, framer 460 may determine an offset value of 3.

As indicated above, FIGS. 5A-5F are provided merely as an example. Other examples are possible and may differ from what was described with regard to FIGS. 5A-5F.

FIG. 6 is a flow chart of an example process 600 for identifying a start of a frame of a lower order ODU flow and reading information from the lower order ODU flow. In some implementations, one or more process blocks of FIG. 6 may be performed by optical receiver 273. In some implementations, one or more process blocks of FIG. 6 may be performed by another device or a set of devices separate from or including optical receiver 273, such as one or more other components of receiver module 270.

As shown in FIG. 6, process 600 may include receiving a higher order ODU flow that includes one or more lower order ODU flows (block 610). For example, optical receiver 273 (e.g., monitor 410) may receive an OTU4 frame that includes an ODU4 flow, which includes one or more multiplexed lower order ODU flows. In some implementations, optical receiver 273 may remove overhead information and FEC information to extract a row of ODU4 information from the OTU4 frame. In some implementations, the ODU4 flow may include one or more lower order ODU flows (e.g., a set of ODU1 flows, a set of ODU2 flows, etc.), that are multiplexed.

In some implementations, optical receiver 273 may process a row of ODU4 information as a set of a particular quantity of bytes. For example, optical receiver 273 (e.g., monitor 410) may process a set of 80 bytes during each clock cycle. In some implementations, optical receiver 273 (e.g., de-mapper 420) may determine whether the set of 80 bytes is valid during a particular clock cycle. For example, de-mapper 420 may process timing information associated with the set of 80 bytes (e.g., a Cm value indicating a quantity of data bytes per frame of the ODU4 frame) to determine whether the bytes are validly associated with a set of lower order ODU flows or whether the bytes are invalid placeholder bytes. If the set of 80 bytes are valid, optical receiver 273 (e.g., streamliner 430) may demultiplex bytes of multiple lower order ODU flows using a multiplexing structure identifier, in some implementations. For example, when multiple lower order ODU flows include non-contiguous bytes within the set of 80 bytes, streamliner 430 may rearrange bytes to make the bytes contiguous for each lower order ODU flow.

In some implementations, optical receiver 273 (e.g., comparator 440) may generate one or more bit masks associated with FAS data. The FAS data may refer to a byte sequence that identifies a start of a frame for a lower order ODU, such as a 0xF6, 0xF6, 0xF6, 0x28, 0x28, 0x28 sequence. For example, comparator 440 may XOR the de-interleaved set of 80 bytes with a particular byte (e.g., a 0xF6 hexadecimal byte, a 0x28 hexadecimal byte, or the like), to generate a mask that identifies whether the particular byte is located at a particular byte location in the set of 80 bytes. Comparator 440 may provide the bit mask to the set of framers 460 that are associated with detecting FAS data included in the lower order ODU flows. In this way, circuit complexity may be reduced by sharing a comparator bit mask with multiple framer circuits.

As further shown in FIG. 6, process 600 may include searching for FAS data in a lower order ODU flow using one or more bit masks associated with the FAS data (block 620). For example, optical receiver 273 (e.g., framer 460) may search for the FAS data in a particular lower order ODU flow, of the one or more lower order ODU flows, using the one or more bit masks. In some implementations, framer 460 may utilize the one or more bit masks to locate the FAS data. For example, the bit mask may indicate that a set of 3 0xF6 bytes are located at a particular set of byte locations, and framer 460 may track the set of byte locations to determine whether the remaining 3 0x28 bytes of FAS data occur sequentially after the set of 3 0xF6 bytes.

In some implementations, a particular framer 460 may be assigned a particular lower order ODU flow, of the set of lower order ODU flows, for which the FAS data is to be located. For example, barrel shifter 450 may shift from a first byte location in the set of bytes (e.g., the first byte of the set of 80 bytes) to a second byte location in the set of bytes (e.g., the first byte of the particular lower order ODU) at which framer 460 is to search for the FAS data.

In some implementations, framer 460 may determine a flow size associated with searching for the FAS data. For example, the lower order ODU may include a particular quantity of bytes for each set of 80 bytes associated with each clock cycle, and framer 460 may search the particular quantity of bytes, in each clock cycle, for the FAS data.

In some implementations, optical receiver 273 may include a particular quantity of framers 460 and barrel shifters 450. For example, when optical receiver 273 is configured to receive sets of 80 bytes which may include up to 80 different lower order ODU flows, optical receiver 273 may include 80 framers 460 with 80 associated barrel shifters 450. Additionally, or alternatively, optical receiver 273 may include another quantity of framers 460. For example, when optical receiver 273 is configured to receive an ODU4 with up to 5 lower level ODU flows, optical receiver 273 may include 5 framers 460 with 5 associated barrel shifters 450.

In some implementations, a particular lower order ODU may be assigned to a particular framer 460 based on framer complexity. For example, optical receiver 273 may determine that the particular lower order ODU includes FAS data occurring across 3 clock cycles or 4 clock cycles (e.g., based on the flow size for the particular lower order ODU and the FAS data size) and may assign the particular lower order ODU to a particular framer 460 that is configured to detect FAS data across 3 clock cycles or 4 clock cycles.

In some implementations, multiple framers 460 may be configured with different complexities. A complexity may refer to a circuit complexity associated with a quantity of clock cycles across which FAS data may be detected by a particular framer 460. Based on the quantity of bytes of the FAS data and the ODU flow size, different patterns of FAS data detection may be present. As an example, assume, a set of 80 bytes, 80 framers 460, and a 6 byte FAS data. In a first scenario, if a higher order ODU includes only 1 lower order ODU than the FAS data will occur in a 1 clock cycle or 2 clock cycles and a 1st framer 460 must be configured to detecting the ODU flow during 1 clock cycle or during 2 clock cycles. In a second scenario, if a higher order ODU includes 80 lower order ODUs, than the FAS data for each lower order ODU flow will occur across 6 clock cycles and every framer 460, including the 1st framer 460 and an 80th framer 460, must be capable of detecting the FAS data across 6 clock cycles. The 1st framer 460 needs to be configured to detect the FAS data across 1 clock cycle, 2 clock cycles, and 6 clock cycles, whereas the 80th framer 460 needs to only be configured, and may only be used, to detect the FAS data across 6 clock cycles. In this way, overall complexity of optical receiver 273 may be reduced by intelligently assigning a particular lower order ODU to a particular framer 460 with a minimum complexity required to detect the FAS data for the lower order ODU and designing the set of framers 460 with minimum complexities associated with handling possible lower order ODU scenarios.

As further shown in FIG. 6, process 600 may include detecting the FAS data and determining an offset value associated with the FAS data (block 630). For example, optical receiver 273 (e.g., framer 460) may detect the FAS data and determine the offset value associated with the FAS data. In some implementations, framer 460 may detect the FAS data in a single clock cycle and may determine the offset value associated with the FAS data. For example, with reference to FIG. 5C, framer 460 may detect the FAS data in a single clock cycle, and the offset value may be calculated as:

$$\text{Offset} = \text{ODU\_slots\_occupied} - \text{FAS\_word\_length} - \text{pos\_1}$$

Where, Offset represents the offset value (e.g., 0), ODU_slots_occupied represents the size of the particular lower order ODU flow (e.g., a quantity of bytes occupied) in each 80-byte set associated with a clock cycle (e.g., 7), FAS_data_length represents the quantity of bytes of the FAS data (e.g., 6), and pos_1 represents the index of the byte position of the first byte of the FAS data (e.g., 1).

Additionally, or alternatively, framer 460 may detect the FAS data across 2 clock cycles and may determine the offset value associated with the FAS data. For example, with reference to FIG. 5E, framer 460 may detect the FAS data in 2 clock cycles (e.g., clock cycle P+1 and clock cycle P+2), and the offset value may be calculated as:

$$\text{Offset} = \text{ODU\_slots\_occupied} - \text{pos\_}L$$

where, Offset represents the offset value (e.g., 0), ODU_slots_occupied represents the size of the particular lower order ODU flow in each 80-byte set associated with a clock cycle (e.g., 4), and pos_L represents the byte position of the last byte of the FAS data (e.g., 4).

Additionally, or alternatively, framer 460 may detect FAS data across another quantity of clock cycles and may determine the offset value associated with the FAS data. For example, when the FAS data is a 6-byte FAS data, framer 460 may detect the FAS data across 1, 2, 3, 4, or 6 clock cycles. In this case, when the FAS data is spread across 3, 4, or 6 clock cycles, framer 460 may utilize a dedicated logic associated with detecting the FAS data. For example, when the particular lower order ODU flow occupies 1 slot for each clock cycle, the start of a frame of the particular lower order ODU flow may be determined using a particular framer 460 configured to detect the FAS data over 6 clock cycles. Similarly, when the particular lower order ODU flow occupies 2 slots for each clock cycle, the start of a frame of the particular lower order ODU flow may be determined using a particular framer 460 configured to detect the FAS data over 3 clock cycles or 4 clock cycles. Similarly, when the particular lower order ODU flow occupies 3 slots or 4 slots, the particular lower order ODU flow may be framed using a particular framer 460 configured to detect the FAS data over 2 clock cycles or 3 clock cycles.

As further shown in FIG. 6, process 600 may include predicting future occurrences of the FAS data for the lower order ODU flow (block 640). For example, optical receiver 273 may predict one or more future occurrences of the FAS data based on the offset value, the flow size for the particular lower order ODU flow, the frame size for the ODU4 frame, or the like. For example, when the offset value is 0, optical receiver 273 may predict that the next FAS data for a particular lower order ODU will occur at the same byte location as the detected FAS data in a particular quantity of clock cycles determined based on the quantity of bytes in each lower order ODU frame.

Additionally, or alternatively, optical receiver 273 may predict a shift in the byte location of the FAS data in a future occurrence based on the offset value. For example, when optical receiver 273 determines an offset value of 2, for a 10 byte flow size and a 1000 byte frame, optical receiver 273 may predict a next FAS data occurrence at an index value of 2. Additionally, or alternatively, optical receiver 273 may predict a quantity of clock cycles for detecting another FAS data occurrence. For example, based on the offset value and a predicted shift in byte location, optical receiver 273 may determine that a first FAS data occurrence detected during a single clock cycle will be detected, for a second FAS data occurrence, during two clock cycles. In this case, optical receiver 273 may select a framer circuit configured to detect FAS data occurrences during two clock cycles for detecting the second FAS data occurrence, facilitating use of a less complex framer circuit than if optical receiver 273 had to account for all possible clock cycle scenarios.

As further shown in FIG. 6, process 600 may include reading information from the lower order ODU flow based on correctly predicting future occurrences of the FAS data (block 650). For example, optical receiver 273 may identify frames of, and read information from the lower order ODU flow based on correctly predicting one or more future occurrences of the FAS data. A start of a frame of the lower order ODU is identified by the occurrence of FAS data, and optical receiver 273 may read information from the lower order ODU based on accurately determining the start of the frame. In some implementations, optical receiver 273 may identify frames of, and read information from the lower order ODU based on predicting a threshold quantity of FAS data occurrences correctly. Additionally, or alternatively, optical receiver 273 may identify frames of and extract information from the lower order ODU based on predicting a location of another FAS data occurrence within a threshold accuracy (e.g., a threshold quantity of byte locations, or the like). Additionally, or alternatively, optical receiver 273 may return to blocks 620-640 based on incorrectly predicting a threshold quantity of FAS data occurrences. In some implementations, optical receiver 273 may cause a network configuration to be altered based on reading information from the lower order ODU flow. For example, optical receiver 273 may provide OAM information, overhead information, or the like associated with the lower order ODU flow which may be used to alter a network configuration.

Although FIG. 6 shows example blocks of process 600, in some implementations, process 600 may include additional blocks, fewer blocks, different blocks, or differently arranged blocks than those depicted in FIG. 6. Additionally, or alternatively, two or more blocks of process 600 may be performed in parallel.

In this way, an optical receiver may identify frames of a lower order ODU multiplexed in a higher order ODU and extract information from the lower order ODU using a spatial framing circuit with reduced circuit complexity (e.g., reduced quantities of look-up-tables, simplified data path architecture, simplified design verification, etc.), reduced latency (e.g., reduced quantities of clock cycles), reduced memory, or the like, as compared with a time-domain framing circuit.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.) and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    generating, by a device, a set of bit masks associated with locating frame alignment signal (FAS) data,
        the set of bit masks being utilized by multiple framer circuits associated with identifying a start of one more frames of multiple lower order Optical channel Data Unit (ODU) flows multiplexed in a higher order ODU flow;
    detecting, by the device, the FAS data at a particular byte location in a particular lower order ODU flow, of the multiple lower order ODU flows, based on the set of bit masks; and
    identifying, by the device, the start of one or more frames of the particular lower order ODU flow based on detecting the FAS data.

2. The method of claim 1, further comprising:
    reading information from the one or more frames of the particular lower order ODU flow.

3. The method of claim 1, further comprising:
    determining an offset value for the FAS data,
        the offset value being associated with a shift in an FAS data location in subsequent frames of the particular lower order ODU flow,
        the subsequent frames being one or more of the one or more frames;
    predicting a set of FAS data locations, as a set of predicted FAS data locations, for a set of subsequent FAS data occurrences associated with a set of subsequent frames of the particular lower order ODU flow; and
    where identifying the start of the one or more frames of the particular lower order ODU flow further comprises:
        identifying the start of the one or more frames based on predicting the set of FAS data locations.

4. The method of claim 3, where a quantity of FAS data locations in the set of FAS data locations is a threshold quantity.

5. The method of claim 3, further comprising:
    determining that the set of FAS data locations are correctly predicted based on determining the set of subsequent FAS data occurrences; and
    reading information from the particular lower order ODU flow based on determining that set of FAS data locations are correctly predicted.

6. The method of claim 3, where the FAS data is detected in a single higher order ODU frame, of the higher order ODU flow, associated with a single clock cycle; and
    where the offset value is determined based on a quantity of data associated with the particular lower order ODU flow in the higher order ODU frame, a quantity of data associated with the FAS data, and the particular byte location.

7. The method of claim 3, where the FAS data is detected in a plurality of higher order ODU frames, of the higher order ODU flow, associated with a corresponding plurality of clock cycles; and
    where the offset value is determined based on a quantity of data associated with the particular lower order ODU flow in each of the higher order ODU frames and a byte position of the FAS data.

8. The method of claim 1, where the higher order ODU flow is an ODU4 flow; and
    where the multiple lower order ODU flows include at least one of:
        a set of ODU0 flows;
        a set of ODU1 flows;
        a set of ODU2 flows;
        a set of ODU2e flows;
        a set of ODU3 flows;
        a set of ODU3e2 flows; or
        a set of ODUflex flows.

9. The method of claim 1, where the FAS data is a string of hexadecimal bytes 0xF6, 0xF6, 0xF6, 0x28, 0x28, and 0x28; and
    where the set of bit masks includes a first bit mask identifying one or more byte locations of a 0xF6 byte and a second bit mask identifying one or more byte locations of a 0x28 byte in a frame of the higher order ODU flow.

10. The method of claim 1, further comprising:
    receiving an ITU-T G.709 Optical Transport Network (OTN) frame based signal,
        the ITU-T G.709 OTN frame based signal including the one or more frames of the multiple lower order ODU flows multiplexed in the higher order ODU flow; and where generating the set of bit masks further comprises:
generating the set of bit masks based on the ITU-T G.709 OTN frame based signal.

11. The method of claim 1, further comprising:
determining a set of clock cycle scenarios based on a quantity of data associated with the particular lower order ODU flow in a higher order ODU frame associated with the higher order ODU flow and a size of the FAS data,
the set of clock cycle scenarios being a set of possible quantities of clock cycles that may include at least a portion of the FAS data; and
assigning the lower order ODU flow to a particular framer circuit, of the multiple framer circuits, based on the set of clock cycle scenarios.

12. An optical receiver, comprising:
a digital signal processor configured to:
receive an Optical channel Transport Unit (OTU) frame that includes a higher order Optical channel Data Unit (HO ODU) flow,
the HO ODU flow including one or more lower order Optical channel Data Unit (LO ODU) flows,
the HO ODU flow being a higher order relative to the one or more lower order ODU flows;
generate a set of bit masks for a particular LO ODU flow of the one or more LO ODU flows;
provide the set of bit masks to a plurality of framer circuits;
detect, by one of the plurality of framer circuits, frame alignment signal (FAS) data, being transmitted via the particular LO ODU flow, for a frame of the LO ODU flow based on the set of bit masks,
calculate an offset value for the FAS data,
the offset value representing a shift in a byte position of the FAS data in a subsequent frame of the particular LO ODU flow;
predict one or more FAS data occurrences, as one or more predicted FAS data occurrences, for one or more subsequent frames of the particular LO ODU flow based on the offset value; and
selectively read information from the particular LO ODU flow based on the one or more predicted FAS data occurrences.

13. The optical receiver of claim 12, where the digital signal processor is further configured to:
determine that a threshold quantity of FAS data occurrences have been incorrectly predicted; and
determine another offset value based on determining that the threshold quantity of FAS data occurrences have been incorrectly predicted;
predict one or more other FAS data occurrences, as one or more other predicted FAS data occurrences, based on the other offset value; and
selectively read information from the particular LO ODU flow based on predicting the one or more other predicted FAS data occurrences.

14. The optical receiver of claim 12, where the HO ODU flow is an ODU4 flow that includes a set of 80 bytes in each frame; and
where the plurality of framer circuits includes 80 framer circuits associated with detecting the FAS data for the one or more LO ODU flows.

15. The optical receiver of claim 12, where the digital signal processor is further configured to:
determine that the one or more FAS data occurrences are predicted within a threshold accuracy level; and where the digital signal processor, when selectively reading information from the particular LO ODU flow, is further configured to:
read information from the LO ODU flow based on determining that the one or more FAS data occurrences are predicted within the threshold accuracy level.

16. The optical receiver of claim 12, where the digital signal processor is further configured to:
perform generic mapping procedure (GMP) de-mapping on the HO ODU flow to validate bytes of the HO ODU flow;
determine that the bytes of the HO ODU flow are valid based on performing the GMP de-mapping; and
where the digital signal processor, when detecting the FAS data, is further configured to:
detect the FAS data based on determining that the bytes of the HO ODU flow are valid.

17. An apparatus comprising:
one or more comparator circuits; and
a plurality of framer circuits;
a comparator circuit, of the one or more comparator circuits, being configured to:
receive a set of bytes of a higher order Optical channel Data Unit (ODU),
generate a bit mask associated with identifying a byte location of a particular byte within the set of bytes,
the particular byte corresponding to a frame alignment signal (FAS);
provide the bit mask to a set of framer circuits, of the plurality of framer circuits,
the set of framer circuits corresponding to a set of lower order ODUs included in the set of bytes of the higher order ODU; and
a particular framer, of the plurality of framer circuits, being configured to:
receive the set of bytes of the higher order ODU and the bit mask,
the set of bytes including a particular set of bytes associated with a particular lower order ODU of the set of lower order ODUs;
determine a location for FAS data for a frame of the particular lower order ODU using the bit mask; and
predict a subsequent location for subsequent FAS data associated with a subsequent frame of the particular lower order ODU based on the location for the FAS data.

18. The apparatus of claim 17, where the particular framer is further configured to:
determine an offset value based on the location for the FAS data; and
where the particular framer, when predicting the subsequent location for subsequent FAS data, is further configured to:
predict the subsequent location based on the offset value and a particular quantity of clock cycles during which FAS data for the frame of the particular lower order ODU occurs.

19. The apparatus of claim 17, where the higher order ODU is an ODU4 signal; and
where the particular lower order ODU is a lower order signal than the ODU4 signal.

20. The apparatus of claim 17, further comprising:
an overhead extractor configured to:
extract information from the particular lower order ODU signal based on the particular framer predicting the subsequent location for the subsequent FAS data associated with the subsequent frame of the particular lower order ODU.

\* \* \* \* \*